US008591324B2

(12) United States Patent
Fitzsimons et al.

(10) Patent No.: US 8,591,324 B2
(45) Date of Patent: Nov. 26, 2013

(54) GAMING SYSTEM HAVING BANKING AND REDEMPTION OF PROGRESSIVE AWARD ENHANCEMENTS

(75) Inventors: Matthew R. Fitzsimons, Lake in the Hills, IL (US); Steven J. Lee, Elmhurst, IL (US); James M. Rasmussen, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 457 days.

(21) Appl. No.: 12/863,155

(22) PCT Filed: Jan. 9, 2009

(86) PCT No.: PCT/US2009/030631
§ 371 (c)(1), (2), (4) Date: Jul. 15, 2010

(87) PCT Pub. No.: WO2009/091676
PCT Pub. Date: Jul. 23, 2009

(65) Prior Publication Data

US 2011/0111845 A1 May 12, 2011

Related U.S. Application Data

(60) Provisional application No. 61/011,295, filed on Jan. 16, 2008.

(51) Int. Cl.
*A63F 13/10* (2006.01)

(52) U.S. Cl.
USPC .................................. 463/27; 463/25; 463/26

(58) Field of Classification Search
USPC .......................................... 463/25–27, 16, 20
See application file for complete search history.

(56) References Cited

U.S. PATENT DOCUMENTS

| | | | | |
|---|---|---|---|---|
| 8,454,434 | B1 * | 6/2013 | Schaefer et al. | 463/27 |
| 2002/0094871 | A1 * | 7/2002 | Luciano et al. | 463/43 |
| 2002/0142822 | A1 * | 10/2002 | Baerlocher et al. | 463/16 |
| 2003/0224846 | A1 * | 12/2003 | Baerlocher | 463/16 |
| 2003/0236116 | A1 * | 12/2003 | Marks et al. | 463/16 |
| 2004/0242320 | A1 | 12/2004 | Jackson | 463/22 |
| 2005/0003880 | A1 | 1/2005 | Englman | 463/16 |
| 2005/0059481 | A1 | 3/2005 | Joshi et al. | 463/27 |
| 2006/0178203 | A1 | 8/2006 | Hughes et al. | 463/27 |
| 2007/0026941 | A1 | 2/2007 | Block et al. | 463/27 |
| 2007/0060319 | A1 | 3/2007 | Block et al. | 463/27 |
| 2007/0060321 | A1 | 3/2007 | Vasquez et al. | 463/27 |
| 2007/0077990 | A1 | 4/2007 | Cuddy et al. | 463/25 |

(Continued)

OTHER PUBLICATIONS

PCT International Search Report for International Application No. PCT/US2009/030631 dated Mar. 2, 2009 (2 pages).

(Continued)

*Primary Examiner* — Damon Pierce
(74) *Attorney, Agent, or Firm* — Nixon Peabody LLP

(57) ABSTRACT

A method of operating a wagering game comprises displaying the wagering game and at least one progressive award, receiving a wager to play the wagering game, and upon the occurrence of a first triggering event, offering the at least one progressive award. The method further comprises determining whether or not the at least one progressive award has been accepted, and if the at least one progressive award has not been accepted, banking a progressive enhancement. The method further comprises, upon the occurrence of a second triggering event, applying the progressive enhancement to the at least one progressive award.

16 Claims, 11 Drawing Sheets

(56) References Cited

U.S. PATENT DOCUMENTS

| | | | | |
|---|---|---|---|---|
| 2007/0191088 | A1 | 8/2007 | Breckner et al. | 463/20 |
| 2007/0213114 | A1 | 9/2007 | Caspers et al. | 463/16 |
| 2007/0259711 | A1 | 11/2007 | Thomas | 463/22 |
| 2008/0015012 | A1 | 1/2008 | Englman et al. | 463/25 |
| 2008/0039191 | A1 * | 2/2008 | Cuddy | 463/25 |
| 2009/0042638 | A1 | 2/2009 | Thomas | 463/27 |
| 2009/0042643 | A1 | 2/2009 | Gagner et al. | 463/27 |
| 2009/0104986 | A1 | 4/2009 | Englman et al. | 463/27 |
| 2009/0111561 | A1 * | 4/2009 | Dewaal et al. | 463/20 |
| 2009/0117974 | A1 | 5/2009 | Hornik | 463/20 |
| 2009/0131159 | A1 | 5/2009 | Englman et al. | 463/27 |
| 2009/0149241 | A1 | 6/2009 | Thomas | 463/20 |
| 2009/0247277 | A1 | 10/2009 | Caspers et al. | 463/20 |
| 2009/0247292 | A1 | 10/2009 | Caspers et al. | 463/27 |
| 2009/0270168 | A1 | 10/2009 | Englman et al. | 463/27 |
| 2009/0305777 | A1 | 12/2009 | Anderson | 463/27 |
| 2010/0016060 | A1 | 1/2010 | Jaffe | 463/27 |
| 2010/0048284 | A1 | 2/2010 | Jaffe | 463/27 |
| 2010/0075741 | A1 | 3/2010 | Aoki et al. | 463/20 |
| 2010/0087246 | A1 | 4/2010 | Ward | 463/27 |
| 2010/0087256 | A1 | 4/2010 | Frattinger et al. | 463/42 |
| 2010/0093422 | A1 | 4/2010 | Gomez | 463/16 |
| 2010/0113131 | A1 | 5/2010 | Aoki et al. | 463/30 |
| 2010/0124989 | A1 | 5/2010 | Englman et al. | 463/27 |
| 2011/0003636 | A1 * | 1/2011 | Thomas et al. | 463/27 |

OTHER PUBLICATIONS

PCT International Written Opinion for International Application No. PCT/US20098/030631 dated Mar. 2, 2009 (4 pages).

* cited by examiner

GAMING SYSTEM HAVING BANKING AND REDEMPTION OF PROGRESSIVE AWARD ENHANCEMENTS

CROSS REFERENCE TO RELATED APPLICATIONS

This application is a U.S. national stage of International Application No. PCT/US2009/030631, titled "Gaming System Having Banking And Redemption Of Progressive Award Enhancements" and filed on Jan. 9, 2009, which claims priority to U.S. Provisional Patent Application Ser. No. 61/011,295, titled "Gaming System Having Banking And Redemption Of Progressive Award Enhancements" and filed on Jan. 16, 2008, each of which is incorporated herein in its entirety.

FIELD OF THE INVENTION

The present invention relates generally to gaming machines, and methods for playing wagering games, and more particularly, to a gaming system providing banking and redemption of progressive award enhancements.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards, which progress or change over time. In one embodiment, progressive jackpots or awards increase over time. In some embodiments, progressive awards are funded, at least in part, by a percentage of coin-in from the gaming machine or a plurality of participating gaming machines. In other embodiments, progressive awards may increase or change over time as a function of other events, such as outcomes of one or more wagering games, or player selections or other inputs. Because the bonus game concept offers tremendous advantages in player appeal and excitement relative to other known games, and because such games are attractive to both players and operators, there is a continuing need to develop gaming machines with new types of bonus games to satisfy the demands of players and operators.

A further way to satisfy the demands of players and operators is to offer a game that provides enhancements to progressive awards. The present invention is directed toward a gaming system having banking and redemption of progressive award enhancements.

SUMMARY OF THE INVENTION

According to one aspect of the present invention, a method of operating a wagering game comprises displaying the wagering game and at least one progressive award, receiving a wager to play the wagering game, and upon the occurrence of a first triggering event, offering the at least one progressive award. The method further comprises determining whether or not the at least one progressive award has been accepted, and if the at least one progressive award has not been accepted, banking a progressive enhancement. The method further comprises, upon the occurrence of a second triggering event, applying the progressive enhancement to the at least one progressive award.

According to another aspect of the invention, a method of operating a wagering game comprises displaying the wagering game, receiving a wager to play the wagering game, and upon the occurrence of a first triggering event, awarding a token associated with at least one progressive enhancement. The method further comprises, upon the occurrence of a second triggering event, redeeming the token and in response thereto applying the at least one progressive enhancement to at least one progressive award.

According to yet another aspect of the invention, a gaming system comprises a wager input device for receiving a wager to play a wagering game, at least one display for displaying the wagering game, and at least one controller to (i) upon the occurrence of a first triggering event, award a token associated with at least one progressive enhancement; and (ii) upon the occurrence of a second triggering event, redeeming the token and in response thereto applying the at least one progressive enhancement to at least one progressive jackpot.

According to yet another aspect of the invention, a computer readable storage medium is encoded with instructions for directing a gaming system to perform the above system and method.

Additional aspects of the invention will be apparent to those of ordinary skill in the art in view of the detailed description of various embodiments, which is made with reference to the drawings, a brief description of which is provided below.

DETAILED DESCRIPTION

Figure 1A:
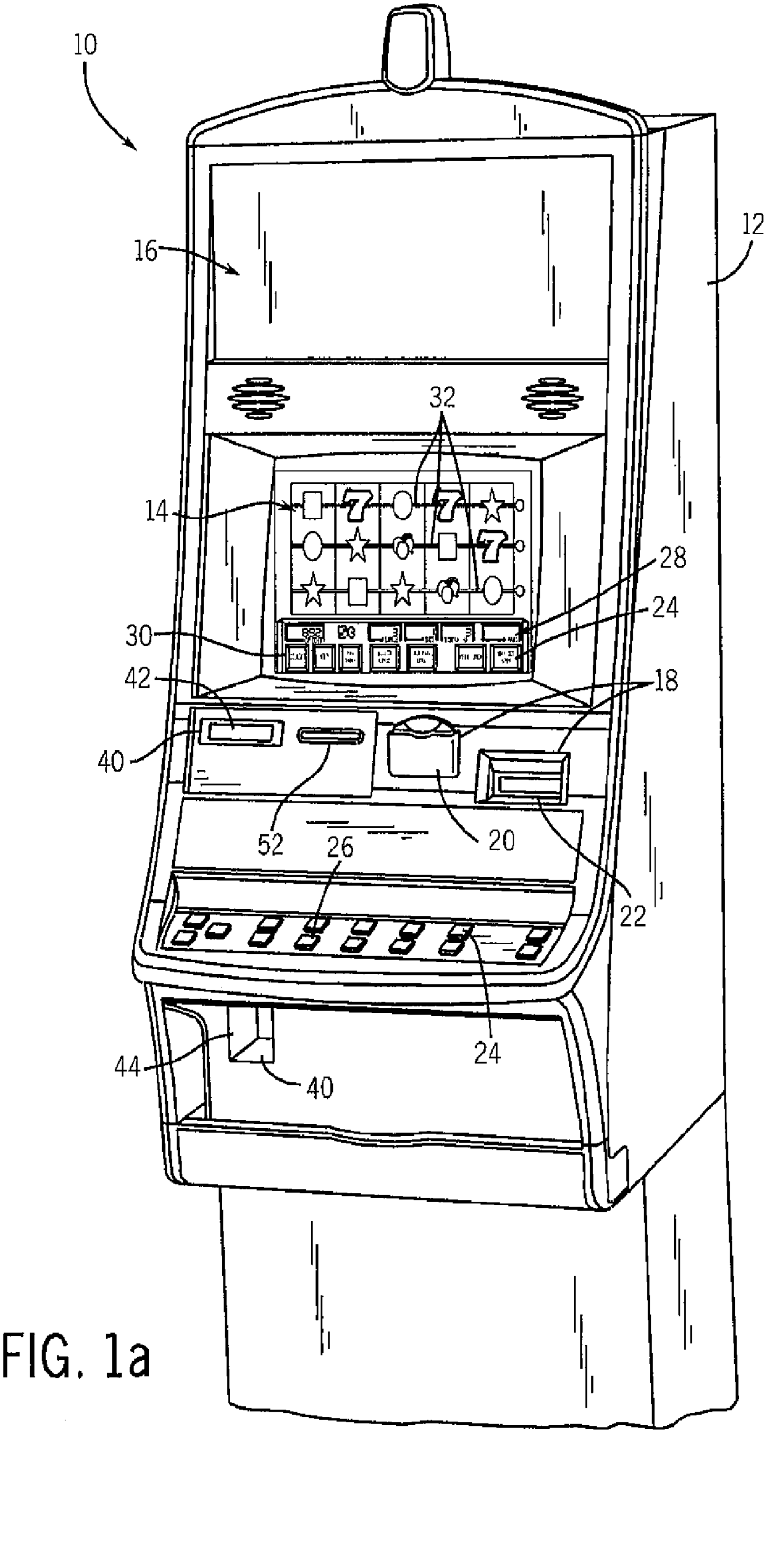
FIG. 1*a* is a perspective view of a free standing gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1*a*, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, any other game compatible with a display comprising at least one symbol-bearing reel strip. The gaming machine 10 may also be a hybrid gaming machine integrating both electronic and electromechanical displays.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1*a*). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of operating the game, while the touch keys 30 may allow for input needed for another aspect of the game.

The various components of the gaming machine 10 may be connected directly to, or contained within, the housing 12, as seen in FIG. 1*a*, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 of the gaming machine 10 may include a number of mechanical reels to display the outcome in visual association with at least one payline 32. Alternatively, the primary display 14 may take the form of a hybrid display incorporating both electromechanical display components, such as reels, with an electronic display, which may include a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1*a* as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 1B:
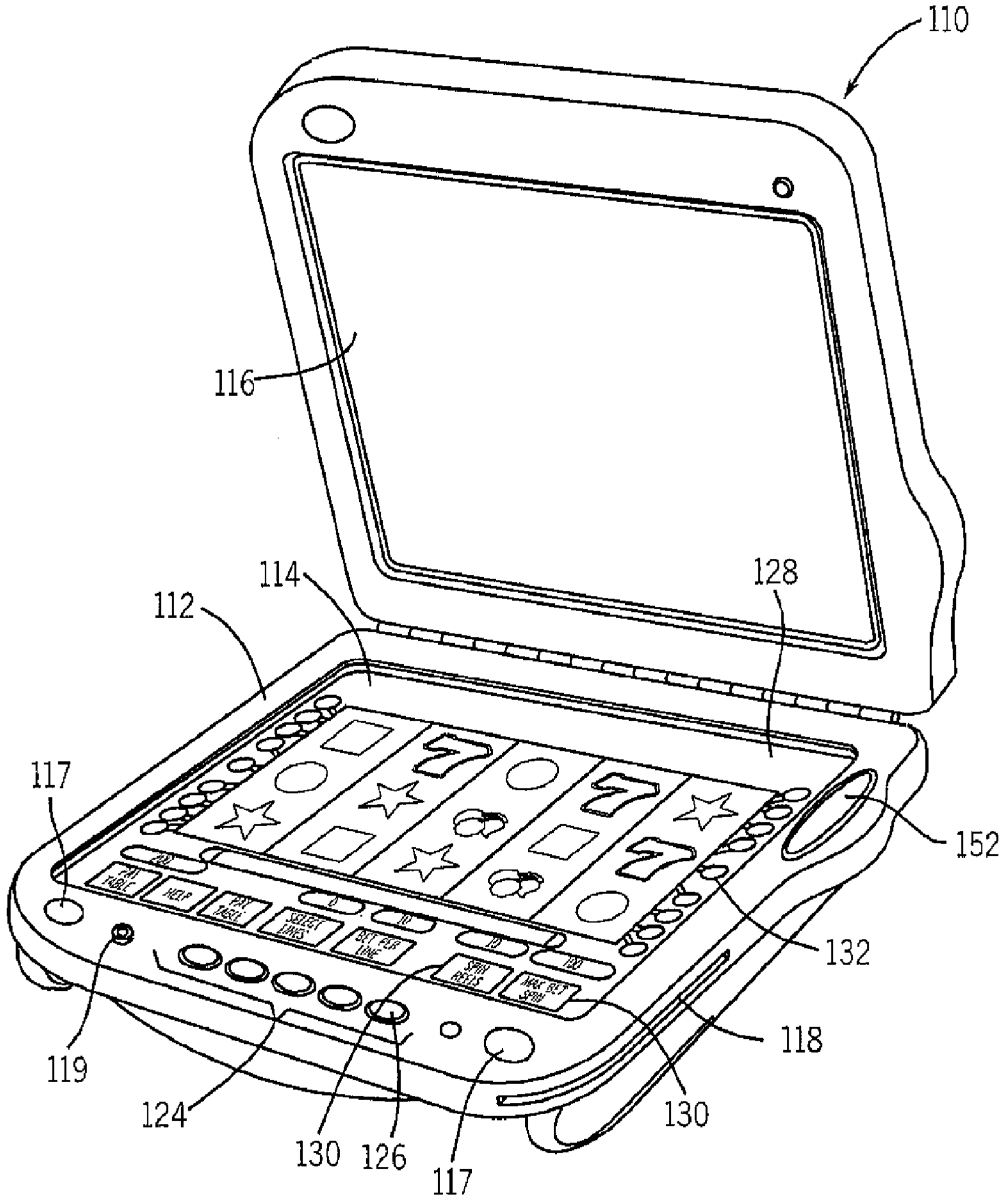
FIG. 1*b* is a perspective view of a handheld gaming machine embodying the present invention.

Depicted in FIG. 1*b* is a handheld or mobile gaming machine 110. Like the free standing gaming machine 10, the handheld gaming machine 110 is preferably an electromechanical gaming machine configured to play mechanical slots, any other game compatible with a display comprising at least one symbol-bearing reel strip. The handheld gaming machine 110 may also be a hybrid gaming machine integrating both electronic and electromechanical displays. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1*b*, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons on a button panel for operating the handheld gaming machine 110. In addition, or alternatively, the player input device 124 may comprise a touch screen 128 mounted to a primary display 114 and/or secondary display 116. In one aspect, the touch screen 128 is matched to a display screen having one or more selectable touch keys 130 selectable by a user's touching of the associated area of the screen using a finger or a tool, such as a stylus pointer. A player enables a desired function either by touching the touch screen 128 at an appropriate touch key 130 or by pressing an appropriate push button 126 on the button panel. The touch keys 130 may be used to implement the same functions as push buttons 126. Alternatively, the push buttons 126 may provide inputs for one aspect of the operating the game, while the touch keys 130 may allow for input needed for another aspect of the game. The various components of the handheld gaming machine 110 may be connected directly to, or contained within, the casing 112, as seen in FIG. 1*b*, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably includes a number of mechanical reels to display the outcome in visual association with at least one payline. Alternatively, the primary display 114 may take the form of a hybrid display incorporating both electromechanical display components, such as reels, with an electronic display, which may include a high resolution LCD, a plasma display, an LED, or any other type of display suitable for use in the handheld gaming machine 110. The size of the primary display 114 may vary from, for example, about a 2-3" display to a 15" or 17" display. In at least some aspects, the primary display 114 is a 7"-10" display. As the weight of and/or power requirements of such displays decreases with improvements in technology, it is envisaged that the size of the primary display 114 may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the basic wagering game on the handheld gaming machine 110 by making a wager (e.g., via the value input device 118 or an assignment of credits stored on the handheld gaming machine via the player input device 124, e.g. the touch screen keys 130 or push buttons 126) on the handheld gaming machine 110. In at least some aspects, the basic game may comprise a plurality of symbols arranged in an array, and includes at least one payline 132 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1*b*, comprises a biometric sensing device.

Figure 2:
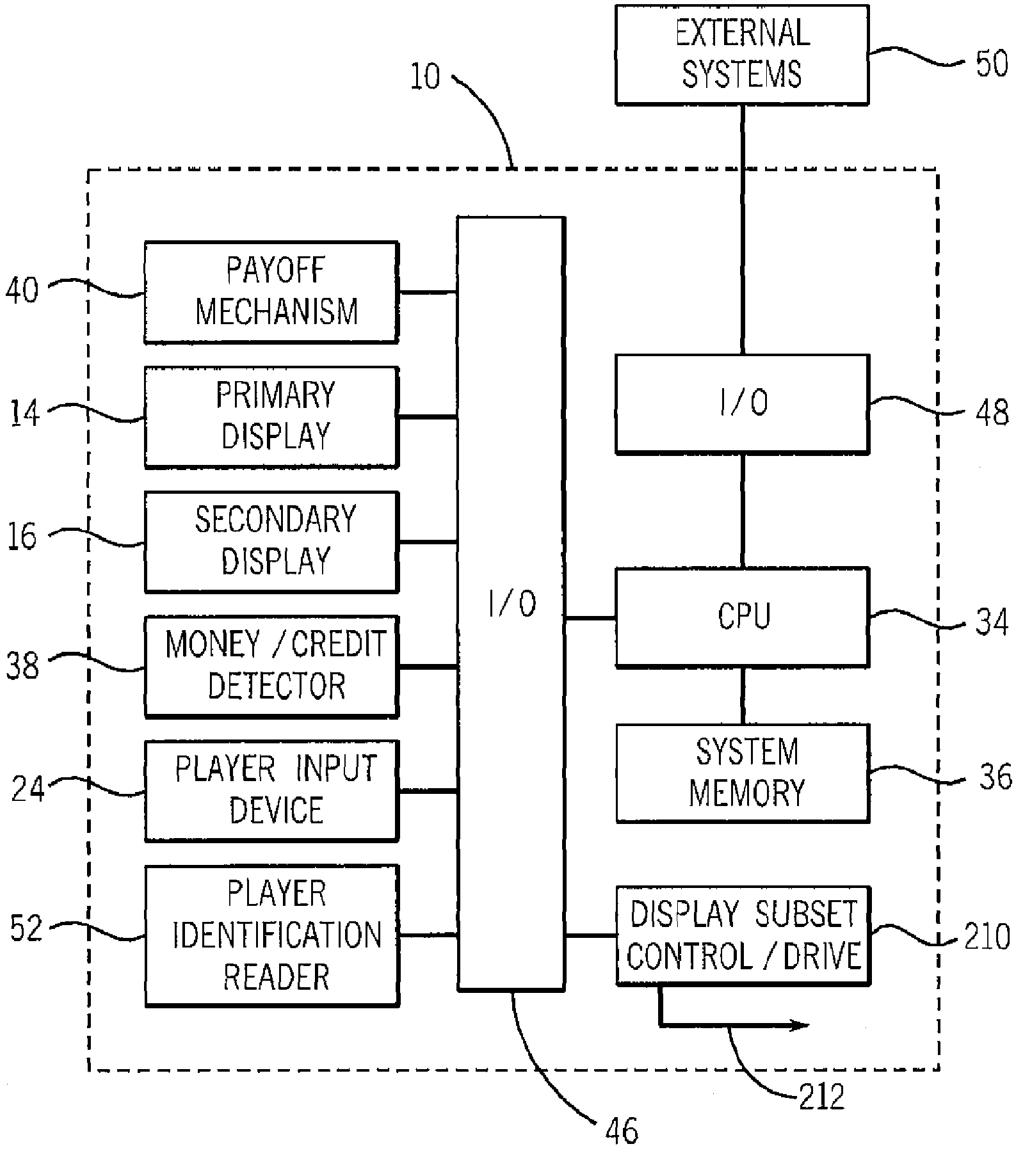
FIG. 2 is a block diagram of a control system suitable for operating the gaming machines of FIGS. 1*a* and 1*b*.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1*a*, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10,110 may communicate with external systems 50 (in a wired or wireless manner) such that each machine operates as a "thin client," having relatively less functionality, a "thick client," having relatively more functionality, or through any range of functionality there between. As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display(s) of the machine In an alternative "thicker client" configuration, the server determines game outcomes, while the controller 34 on board the gaming machine executes game code and processes display information to be displayed on the display(s) of the machines. In yet another alternative "thick client" configuration, the controller 34 on board the gaming machine 110 executes game code, determines game outcomes, and processes display information to be displayed on the display(s) of the machine Numerous alternative configurations are possible such that the aforementioned and other functions may be performed onboard or external to the gaming machine as may be necessary for particular applications. It should be understood that the gaming machines 10,110 may take on a wide variety of forms such as a free standing machine, a portable or handheld device primarily used for gaming, a mobile telecommunications device such as a mobile telephone or personal daily assistant (PDA), a counter top or bar top gaming machine, or other personal electronic device such as a portable television, MP3 player, entertainment device, etc.

Figure 3:
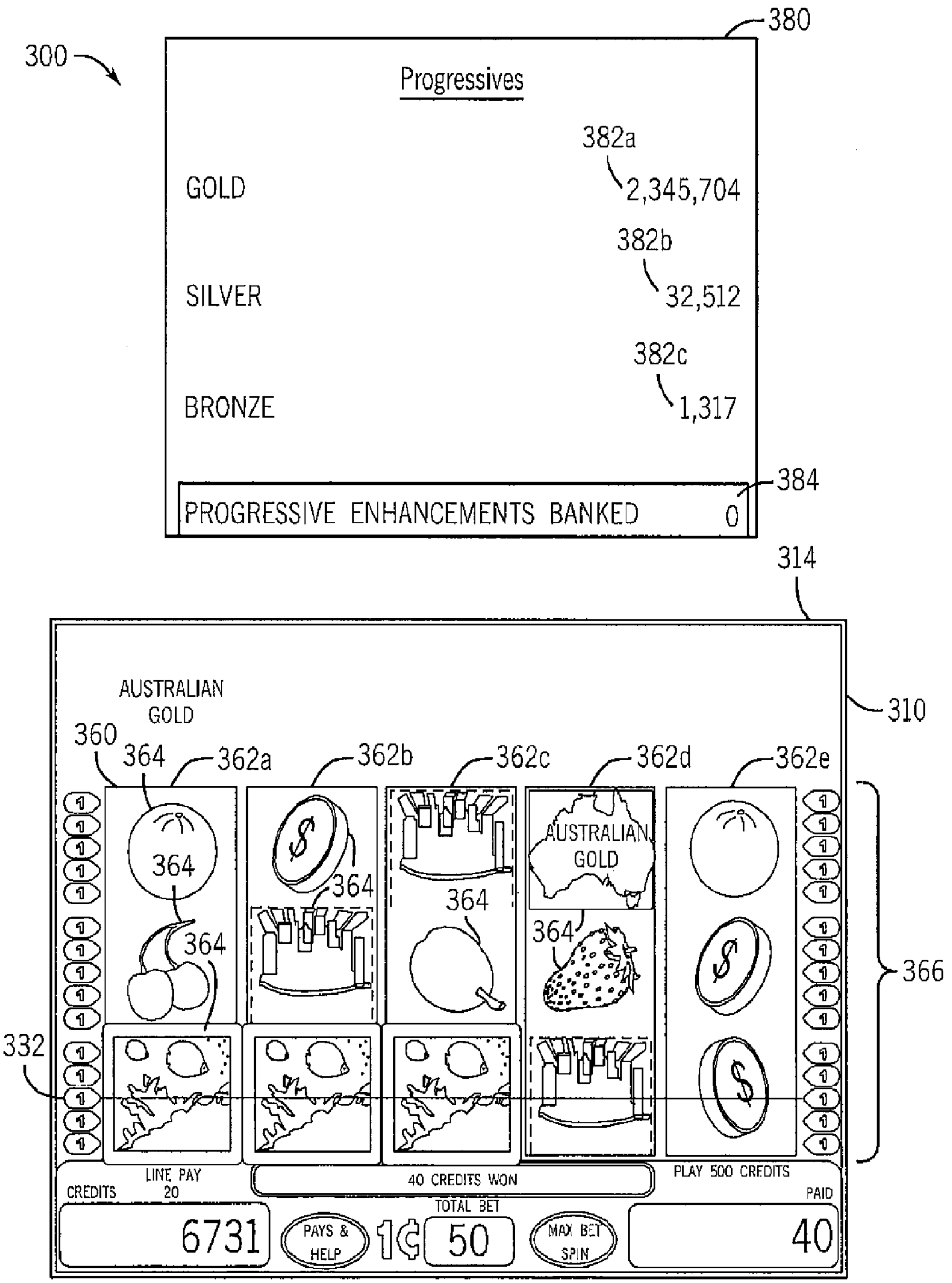
FIG. 3 is a screen shot of a primary display displaying a wagering game and a secondary display displaying associated progressive awards.

Turning now to FIG. 3, a primary display 314 and secondary display 380 of a gaming device 310 of a gaming system 300 are shown. The primary display 314 may be any form of display such as those described herein with reference to the free standing and handheld gaming devices of FIGS. 1*a* and 1*b*. The primary display 314 includes a display of a wagering game 360, which in this embodiment is a slot game as shown in FIG. 3. The slot game 360 includes a plurality of reels 362*a,b,c,d,e* that may be either electro-mechanical reels or simulations thereof on the primary display 314. The reels 362*a,b,c,d,e* include a plurality of symbols 364 displayed thereon which vary as the reels 362*a,b,c,d,e* are spun and stopped. The symbols 364 may include any variety of graphical symbols, elements, or representations, including symbols 364 which are associated with one or more themes of the gaming machine or system. The symbols 364 may also include a blank symbol or empty space. As described herein, the symbols 364 landing on the active paylines 332 (the paylines 332 for which a wager has been received) are evaluated for winning combinations. If a winning combination of symbols 364 lands on an active payline 332, a primary award is awarded in accordance with a pay table of the gaming device. The symbols 364 on the reels 362*a,b,c,d,e* form an array 366 or matrix of symbols 364, having a number of rows and columns, which in the embodiment shown is three rows and five columns. In alternate embodiments, the array 366 may have greater or fewer symbols 364, and may take on a variety of different forms having greater or fewer rows and/or columns. The array 366 may even comprise other non-rectangular forms or arrangements of symbols 364.

The secondary display 380, such as an LCD or plasma display, may be affixed to the gaming device 310, or may alternatively be mounted above one or more gaming devices 310 in a casino. The secondary display 380 is in communication with other components of the system 300 such as the gaming device 310. The secondary display 380 displays one or more progressive awards or jackpots 382,*a,b,c* which in this embodiment are "GOLD", "SILVER", and "BRONZE" level progressive jackpots. The progressive jackpots 382*a,b,c* may be associated with one or more progressive wagering games. The progressive wagering games may include selection games, slot reel games, board games, competitions, group games, interactive games, or any other wagering game in which one or more of the awards or prizes are progressive jackpots 382*a,b,c*. Upon the occurrence of a triggering event, one or more of the progressive jackpots 382*a,b,c* may be awarded to a player of the gaming system 300, either directly or via one or more progressive games. Also depicted in the embodiment shown in FIG. 3, the secondary display 380 includes a progressive enhancements banked meter 384 that counts and displays a number of progressive enhancements which have been saved, stored or banked by a player of the system 300.

A variety of triggering events may be used for awarding one or more progressive awards. For example, in an embodiment, progressive awards may be triggered in "mystery" fashion. A mystery trigger is a trigger that is not dependent on the displayed outcome(s) of the wagering game 360. Instead, a mystery triggering event is communicated to the player only when it occurs, but the player may be unaware of what caused the triggering event. For example, the player may be simply informed, via the primary display, secondary display or accompanying audio, that he has been awarded a progressive award. Such "mystery" triggering events may be driven by a number of mechanics which are not observable by the player. For example, mystery triggering events may include time-based triggers where a progressive jackpot 382*a,b,c* is awarded after a certain amount of time has elapsed. Moreover, the mystery trigger may be a randomly selected event, such as intermittently randomly selecting a number from a pool of numbers until the selected number matches a triggering number or range of numbers, such that the progressive jackpots 382*a,b,c* are randomly awarded. In yet other embodiments, mystery triggering events may include a threshold time playing a wagering game 360 (time on device), total wagers input meeting a predetermined amount (coin in), accumulation of a certain amount of credits, points, or assets, etc.

In an alternate embodiment, the triggering event may be dependent on the displayed outcome of the wagering game, for example, a symbol driven triggering event. A symbol driven triggering event, or "a symbol triggered" progressive award, may comprise, for example, three or more symbols aligning on an active payline. In alternative embodiments, other outcome-based triggers may be used. For example, symbols in the wagering game being arranged in predetermined patterns, order, or arrangements may trigger the award of a progressive award. In other embodiments, player selection of an appropriate selectable element may reveal an award, which may include a progressive award. In yet other embodiments, the outcome-based triggering events may include accumulation of certain assets or advancement to certain stages or episodes within the game.

In the embodiment shown, the progressive jackpots 382*a, b,c* comprise a monetary award. In other embodiments, the jackpot 382*a,b,c* may be a number of free spins a player may take, the jackpot 382*a,b,c* may be a chance to play another progressive game, or the jackpot 382*a,b,c* may be any other type of award that may be awarded to a player.

Figure 4:
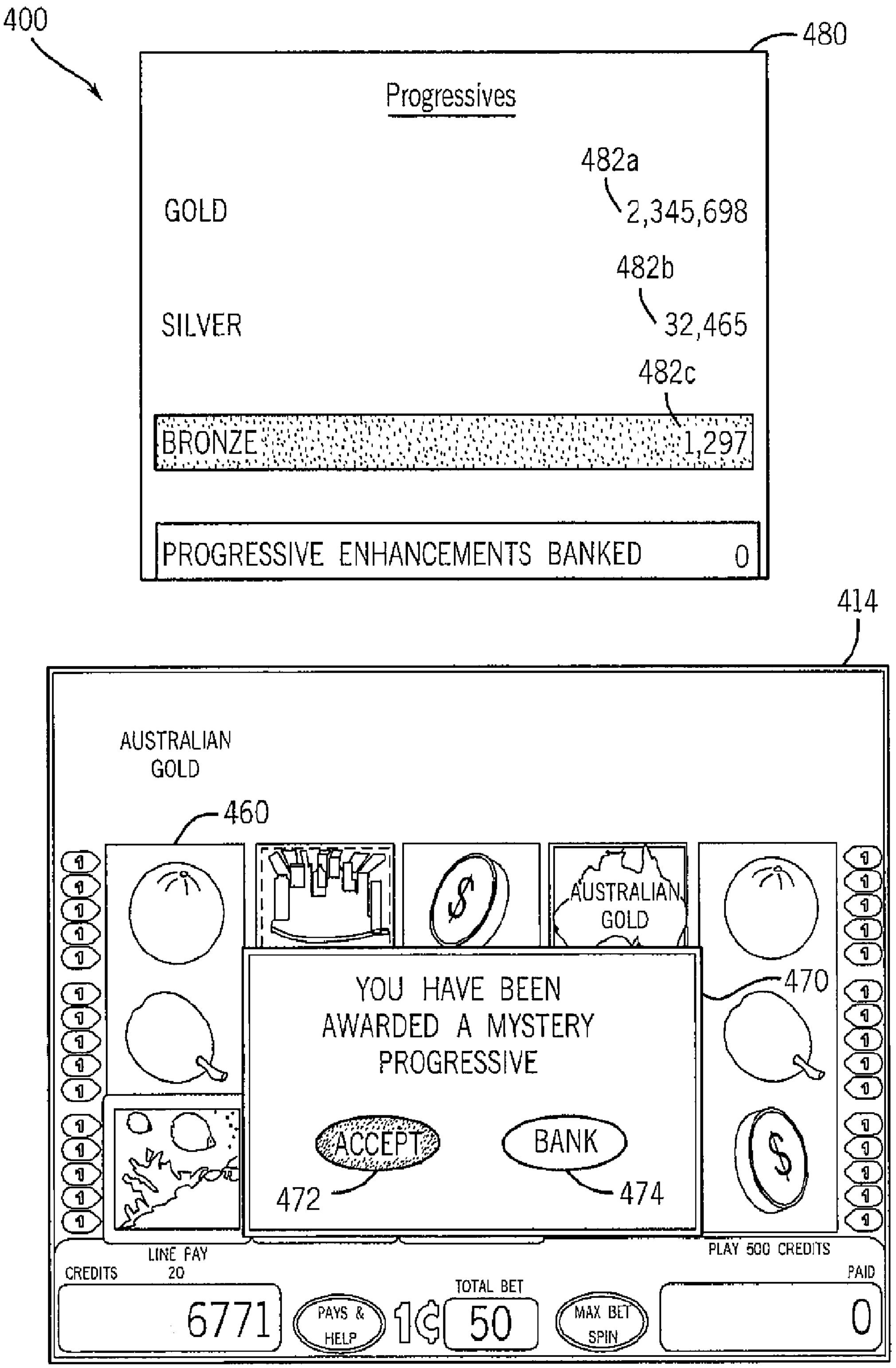
FIG. 4 is a screen shot of a primary and secondary display depicting a mystery progressive award triggering event.

Turning to FIG. 4, the primary and secondary displays 414,480 are shown depicting a player winning a mystery triggered progressive award 482*a,b,c* and not banking the progressive award 482*a,b,c* (i.e., accepting the progressive award 482*a,b,c* offered). In this example, play of the wagering game 460 results in a first triggering event which causes an award of a progressive award 482. In this embodiment, the first triggering event is a mystery triggering event. In this instance, the provided progressive award is randomly selected from a plurality of available progressive awards 482*a,b,c*. As seen in FIG. 4, the BRONZE level progressive award 482*c* has been selected and awarded. The BRONZE level progressive award 482*c* of the secondary display 480 is highlighted to indicate that the player won the BRONZE level progressive award 482*c*. As seen on the secondary display 480, the progressive enhancements banked meter 484 depicts zero ("0"), indicating that no progressive enhancements have been received and banked by the player.

Overlying the wagering game 460 on the primary display 414 is a pop-up window 470 that communicates to the player that the player won a progressive award 482*a,b,c* in response to the occurrence of the first mystery triggering event. The pop-up window 470 further notifies the player that he may either accept the progressive award 482 or bank a progressive enhancement for later use. The player is prompted to provide an input via an accept button 472 or bank button 474, to either accept or bank the progressive award 482*c* for later redemption. In this embodiment the accept key 472 and bank key 474 are displayed on the primary display 414 and the respective inputs are received via a touch screen overlying the pop-up window 470. The player accepts the progressive award 482*c* by touching the "ACCEPT" button 472 on the pop-up window 470. Once the player has decided to accept the progressive award 482, the system 400 reveals to the player which of the plurality of progressive awards 482*a,b,c* he has won. In this case, the player is provided the BRONZE level progressive award 482*c*. In an embodiment, the award 482 to be provided may be selected before the player decides whether or not to accept the award, or alternatively may be selected after the player's decision to either accept or bank the award. If selected prior to the player's input, the selection may either be immediately revealed to the player, or delayed until the player's input is received, as seen in FIG. 4.

Figure 5:
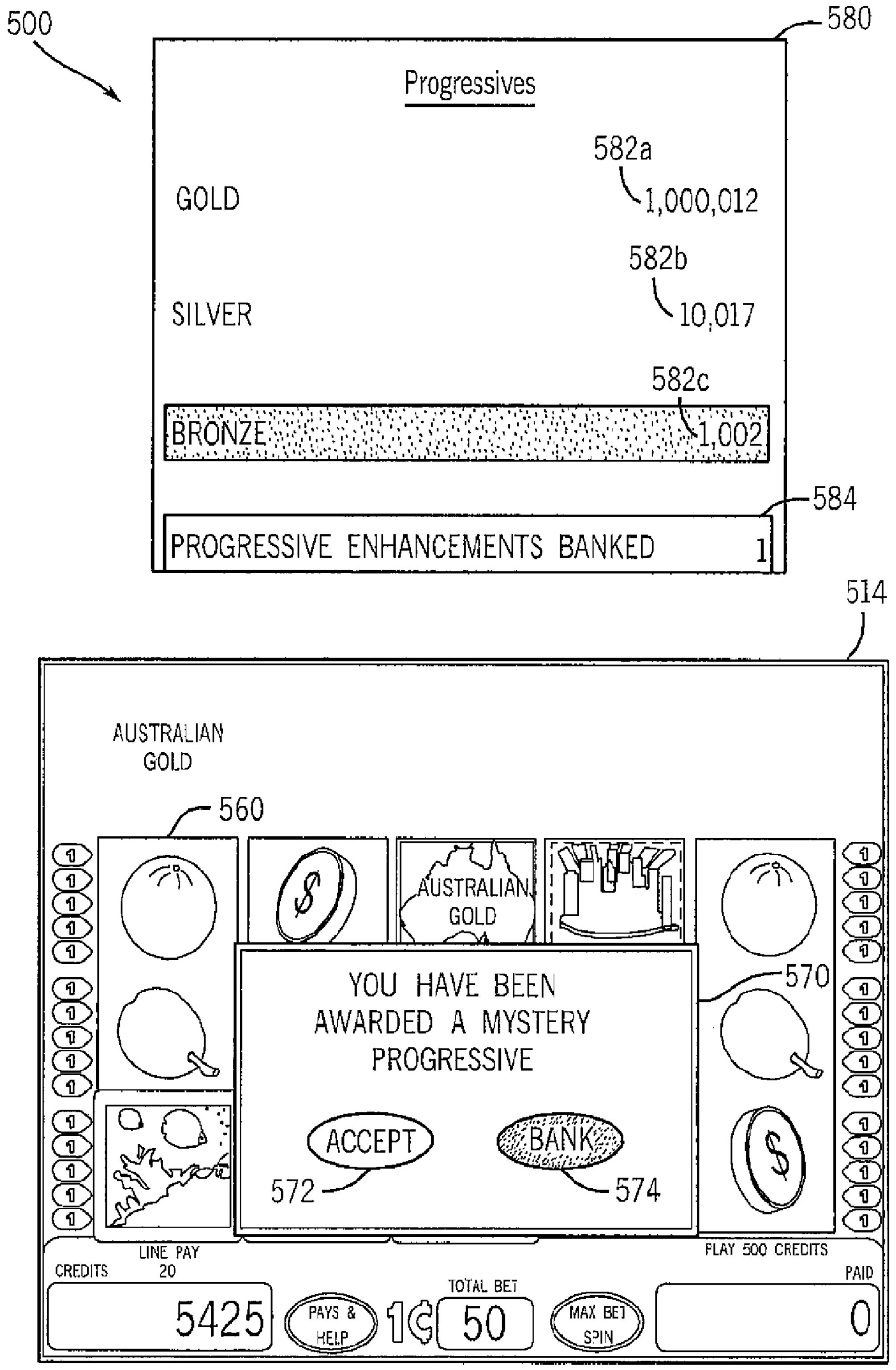
FIG. 5 is a screen shot of a primary and secondary display depicting banking of a mystery triggered progressive award.

Turning to FIG. 5, the primary and secondary displays 514,580 are shown depicting a player winning a progressive award 582 and banking a progressive award enhancement for later use or redemption, rather than accepting the progressive award. In this example, play of the wagering game 560 results in a first mystery triggering event which causes an award of a progressive award 582. Again, the mystery triggering event occurs randomly and the player is notified. As before, the provided progressive award is randomly selected from a plurality of available progressive awards 582*a,b,c* if the player presses the accept 572 button.

Overlying the wagering game 560 on the primary display 514 is a pop-up window 570 that communicates to the player that the player won a progressive award 582*a,b,c* in response to the occurrence of the first mystery triggering event. Again, the player is prompted to provide an input via an accept button 572 or bank button 574, to either accept or bank the progressive award 582*c* for later redemption. The player, on this play of the game, banks a progressive award enhancement by touching the "BANK" button 574 on the pop-up window 570, as seen by the highlighting in FIG. 5. By selecting the "BANK" button 574, the player forgoes receiving one of the progressive awards 582, but in exchange is provided a progressive award enhancement that can be redeemed by the player on a future play of the game. Because the progressive award enhancement is banked, the meter displaying total progressive enhancements banked 584 is incremented from zero ("0") to one ("1").

In an alternative embodiment, the progressive enhancements banked may be represented by progressive enhancement tokens, charms, assets, characters, or any other graphical representation. Each such "token" may be "stored" visually on one or more of the displays 514,580 and represented graphically (for example a line of tokens each one representing one enhancement collected). The "tokens" can then later be redeemed for a future progressive enhancement. Such a graphical display of "tokens" may be used in addition to, or instead of, the meter 584 displaying the number of enhancements banked. In such an embodiment, when a player forgoes receiving a progressive award, the player receives a token which is graphically represented. Upon receipt of the token, the number of tokens the player possesses is incremented. When the player redeems the token in exchange for a progressive enhancement, the number of tokens the player possesses is decremented.

As described herein, the progressive enhancements or "tokens" banked by the player may be later redeemed. In an embodiment, "enhancing" a subsequent progressive jackpot results in a player being awarded a higher-level jackpot. For example, if a player wins a SILVER level progressive award and the player redeems a banked progressive award enhancement, the SILVER level progressive award is enhanced or upgraded to the GOLD level progressive award. In an alternative embodiment, the "enhancement" may comprise elimination of one or more lower level progressive awards prior to the selection of the award to be given to the player, thereby increasing the player's likelihood of obtaining a larger award. Yet other "enhancements" may be provided in exchange for redemption of the banked progressive award enhancements, such as providing the player with additional selections in a picking game, providing the player a multiplier or additional credit amount, etc.

Figure 6:
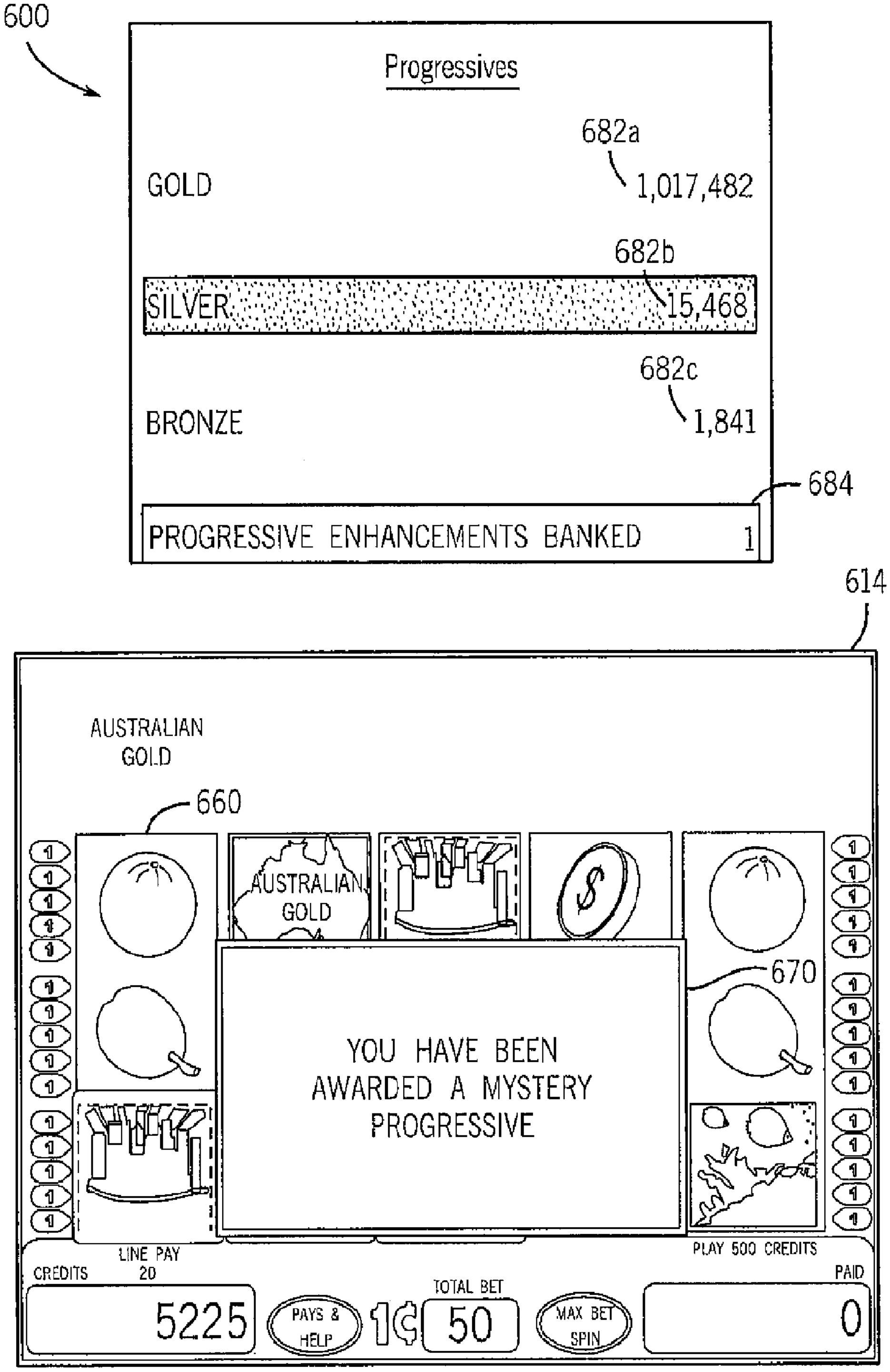
FIG. 6 is a screen shot of a primary and secondary display depicting the occurrence of a subsequent mystery progressive award triggering event.

Turning to FIG. 6, the primary and secondary displays 614,680 are shown depicting a player winning a progressive award 682 on a subsequent play of the game, and enhancing the progressive award 682 by redeeming a banked progressive award enhancement. Because there is already at least one progressive award enhancement banked 684, when a subsequent mystery triggering event occurs so as to trigger a progressive award 682, the player may be given the opportunity to enhance or upgrade the progressive award by redeeming one or more of the collected progressive enhancements. In one embodiment, the player is given the option as to when and how many enhancements to redeem. In other embodiments, restrictions may be placed on enhancement redemption. For example, a player may be permitted to collect up to a predetermined number of enhancements (e.g. three enhancements) after which he must use at least one of the enhancements to enhance a subsequent progressive award. In other embodiments, when a player wins a progressive award 682 while having a predetermined number of enhancements banked, the subsequent progressive award is automatically upgraded to a higher-level award. In one embodiment, the player is only permitted to collect a maximum of one progressive enhancement which is automatically applied to the next progressive award won.

In the embodiment shown in FIG. 6, the system 700 has determined that an enhancement is to be applied to the awarded progressive award. This determination may be the function of the application of a rule set (e.g. automatic enhancement) or as a result of receiving an appropriate player input. In this example, the system randomly selects a progressive award 682*b* (in this case the SILVER award) from the available progressive awards 682*a,b,c* to be awarded to the player. Because the meter 684 has remaining enhancements which have been banked, one or more of the banked enhancements is redeemed and functions to enhance the awarded progressive 682*b*. Overlying the wagering game 660 on the display 614 is a pop-up window 670 that communicates to the player that the player won a progressive award 682*a,b,c* in response to the occurrence of the second mystery triggering event. In this case, the pop-up window 670 notifies the player that the player won the SILVER level progressive award 682*b*.

Figure 7:
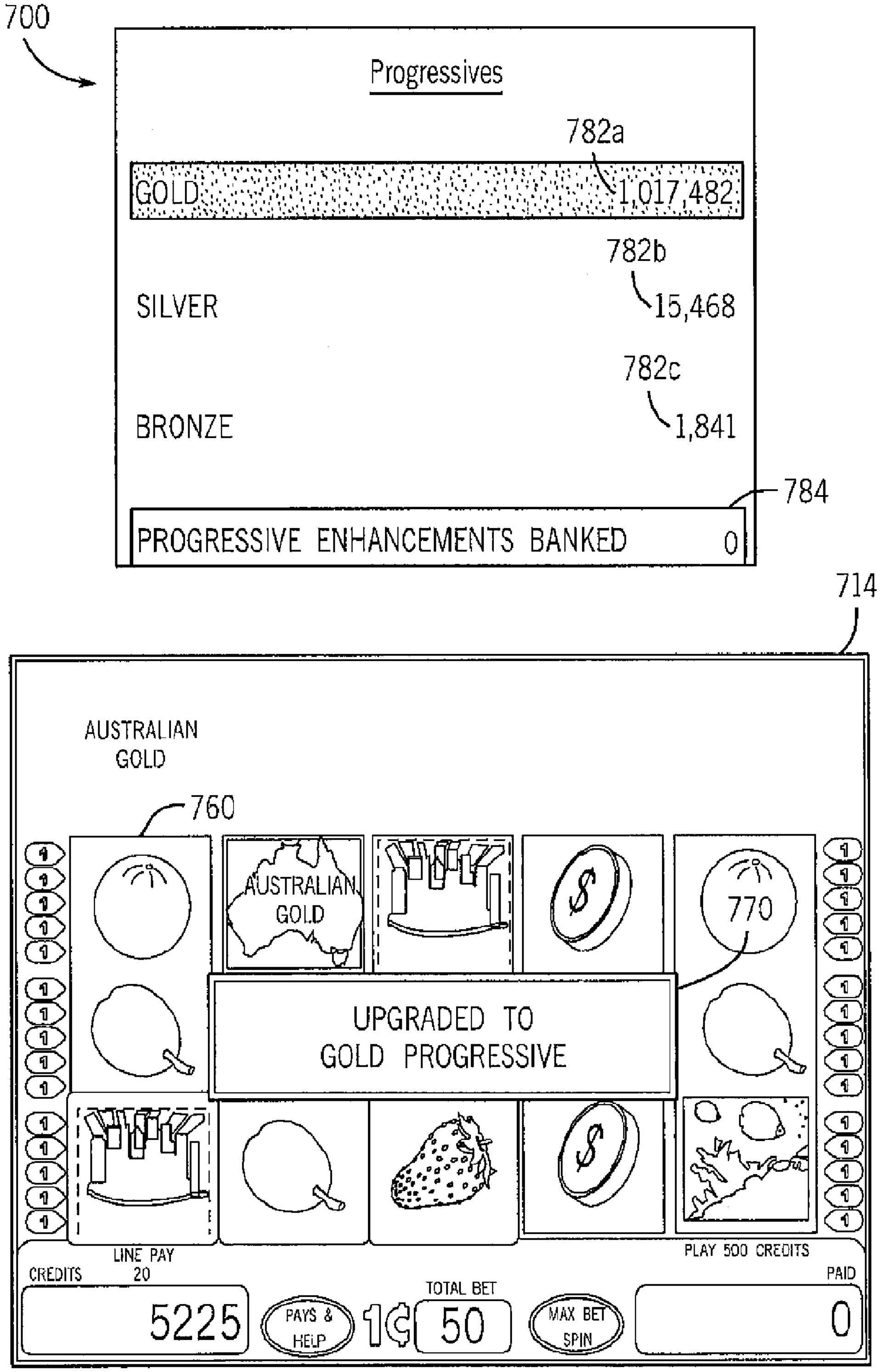
FIG. 7 is a screen shot of a primary and secondary display depicting an enhancement of the progressive award of FIG. 6.

The upgrade from the SILVER level progressive award 682*b* to the GOLD level progressive award 682*a* is illustrated in FIG. 7. In this instance, the progressive award 782 is enhanced from the SILVER level progressive jackpot 782*b* to the GOLD level progressive jackpot 782*a*, as seen in FIG. 7. When the player wins the SILVER level progressive award, the SILVER level progressive award 782*b* is highlighted (see FIG. 6), but when the enhancement is redeemed, the GOLD level award 782*a* is highlighted to indicate the upgrade or enhancement. Redemption of the enhancement causes the meter 784 to subtract one enhancement and display an updated balance of available enhancements. Thus, the meter 784 now shows a balance of zero ("0"). Overlying the primary games 760 on the display 714 is a pop-up window 770 that communicates to the player that the player ultimately won the GOLD level progressive jackpot 782*a* as a result of the enhancement or upgrade.

Figure 8:
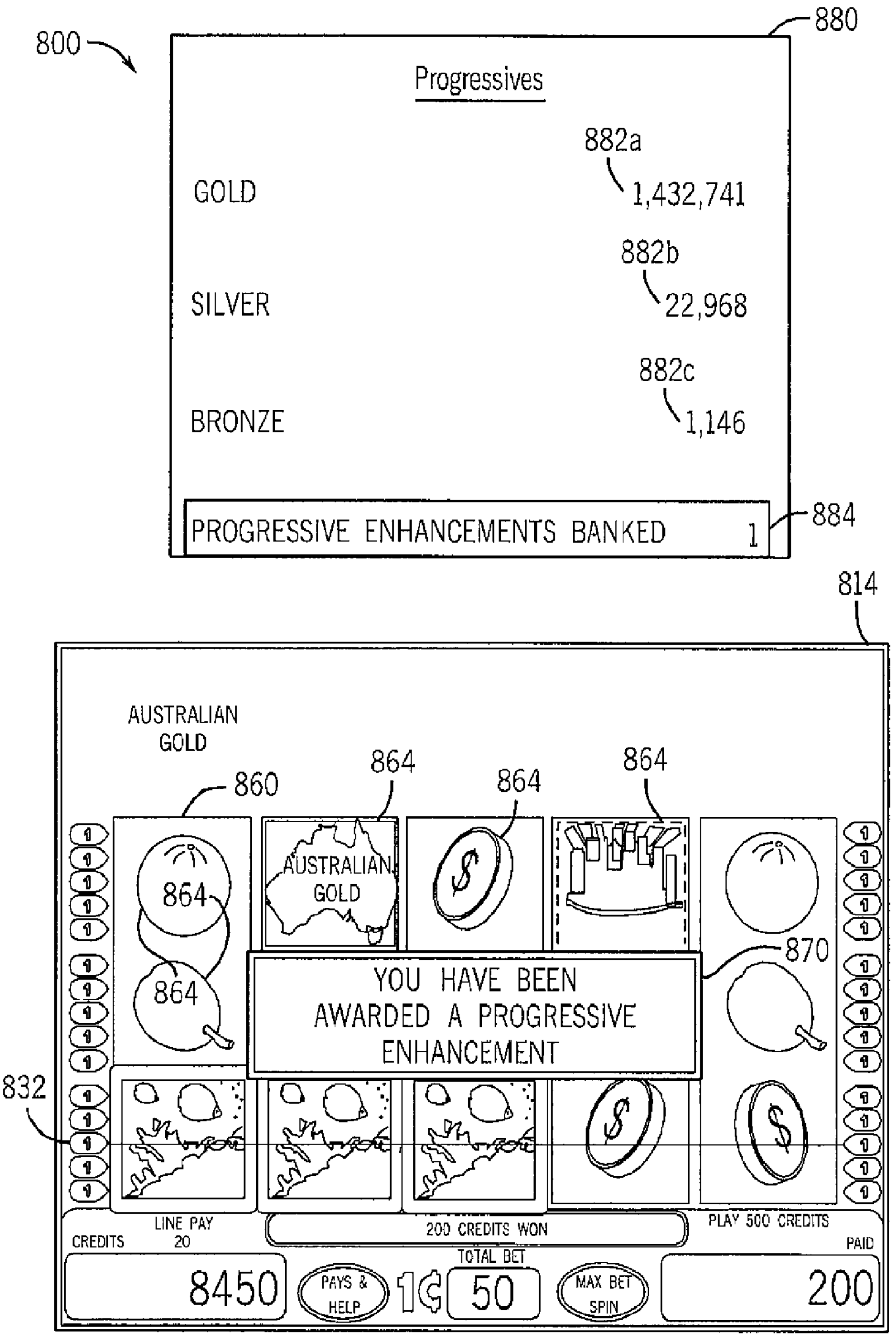
FIG. 8 is a screen shot of a primary and secondary display depicting a player winning a symbol triggered progressive enhancement.

An alternative embodiment of a gaming system 800 is shown in FIG. 8, which represents a screen shot of a primary display 814 and secondary display 880 of a gaming system 800 depicting a player winning a progressive enhancement 884. The embodiment of FIG. 8 depicts a gaming system 800 where a symbol driven triggering event causes an award of one or more progressive enhancements 884. The symbol driven triggering event may be a particular outcome in a wagering game 860. For example, as seen in FIG. 8, three or more "Fish" symbols aligning on an active payline 832 in a wagering game 860 trigger the awarding of a progressive enhancement. Thus, in this embodiment, collection of progressive enhancements is independent of awards of progressive jackpots 882. While progressive awards 882 are provided via a mystery triggering event, progressive enhancements are collected via outcome-based triggering events, such as the occurrence of certain symbol combinations.

In the embodiment depicted in FIG. 8. the occurrence of a symbol driven triggering event results in a player winning a progressive enhancement. Overlying the wagering game 860 on the primary display 814 is a pop-up window 870 that communicates to the player that the player won a progressive enhancement in response to the occurrence of the first triggering event. A progressive enhancements banked display 884 (on the secondary display 880) indicates the number of collected progressive enhancements 884 a player has available that may be redeemed or applied to future progressive awards to enhance such future progressive jackpots 882*a,b,c*. As seen on the secondary display 880, the meter 884 depicts one ("1"), indicating the player received one progressive enhancement 884 that may be later redeemed.

Figure 9:
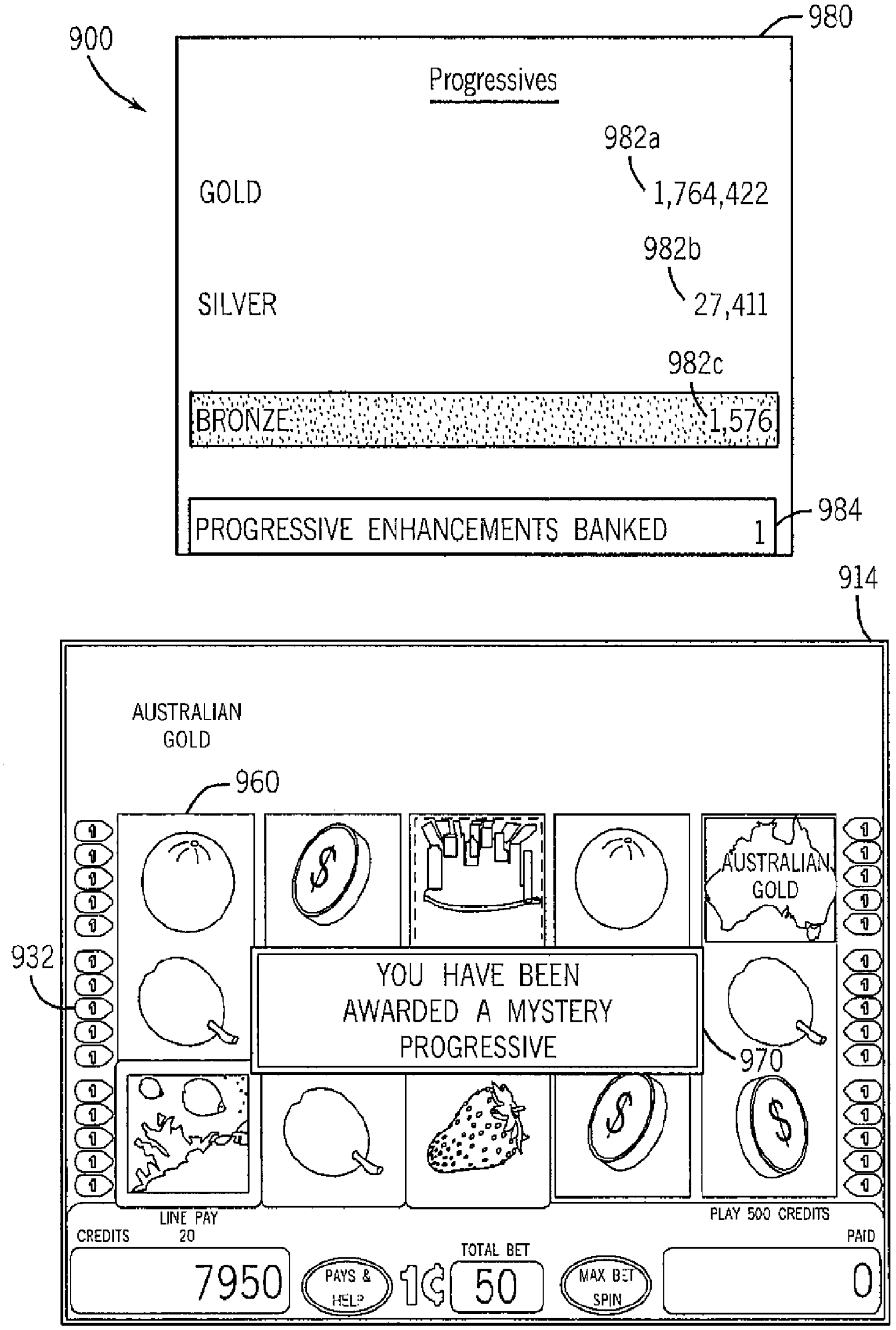
FIG. 9 is a screen shot of a primary and secondary display depicting mystery triggered progressive award when at least one progressive enhancement is banked.

Turning to FIG. 9, the primary and secondary displays 914,980 are shown depicting a subsequent play in which a player wins a progressive award 982*a,b,c* while the player has at least one progressive enhancement 984 available for redemption. In this example, a mystery triggering event occurs which causes a progressive jackpot 982 to be awarded to the player. In this embodiment, the second or subsequent mystery triggering event is a randomly triggered occurrence, as described herein with reference to FIG. 3. One or more of the progressive enhancements 984, which were previously awarded and collected, may be redeemed for an enhancement of a progressive award 982*a,b,c*, as described with reference to FIG. 10. The enhancement of the subsequently awarded progressive award operates in similar fashion to the enhancement of the progressive award described in FIGS. 7-8. Again, the redemption may be initiated by player input, may occur in accordance with one or more rule sets, or may occur automatically if a threshold number of enhancements is collected. When redeemed, the progressive enhancement is applied to a subsequent progressive award and causes it to be enhanced. Moreover, the player may be required to decide whether to redeem the progressive enhancement prior to finding out what the awarded progressive is, or alternatively, may be allowed to upgrade the progressive jackpot via redeeming the progressive enhancement after the awarded progressive is revealed. Thus, in one embodiment, if a player is awarded a BRONZE progressive award 982*c*, the progressive enhancement 984 is redeemed and the player is automatically upgraded or enhanced to the next higher-level SILVER level progressive award 982*b*.

Figure 10:
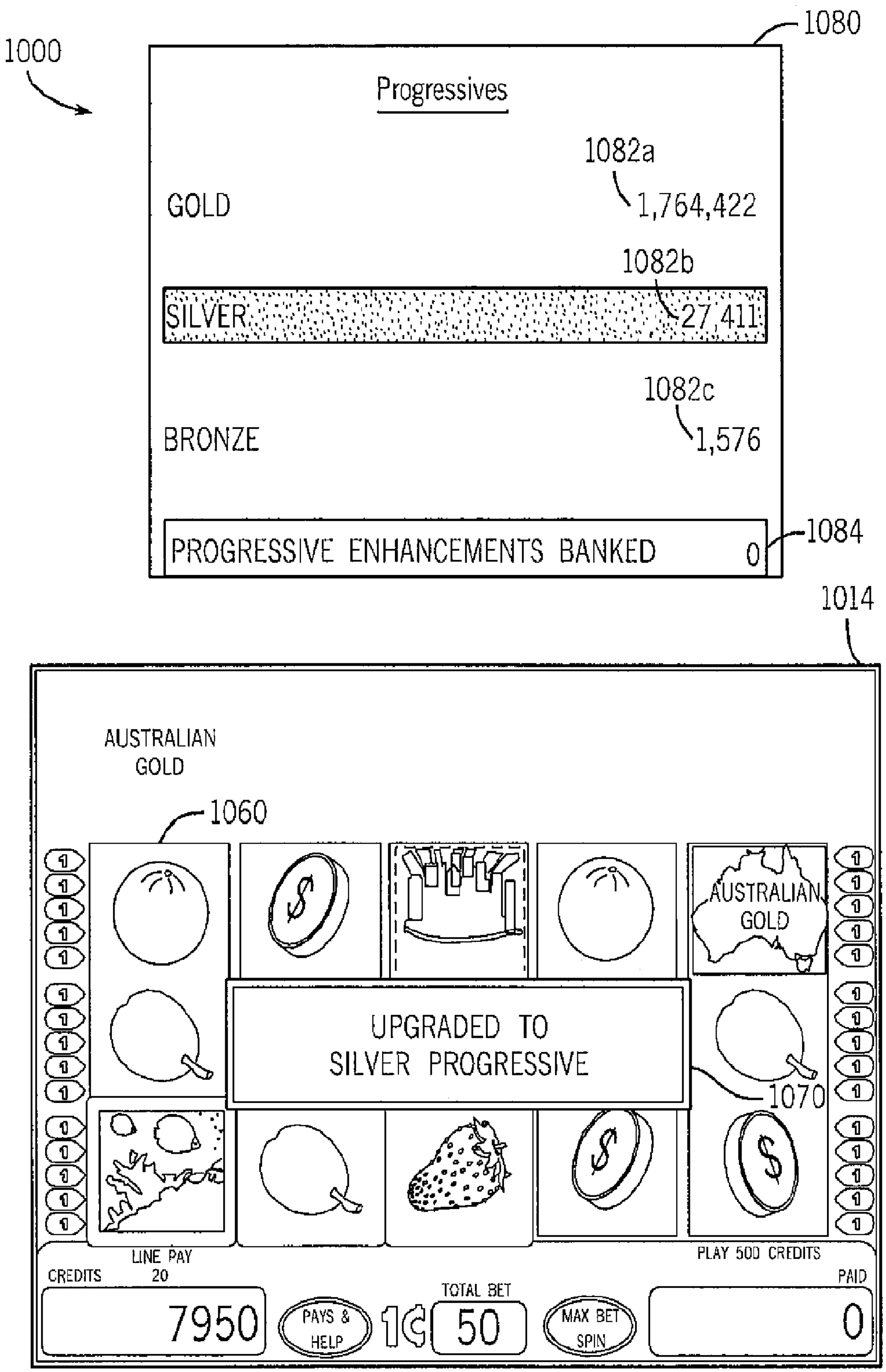
FIG. 10 is a screen shot of a primary and secondary display depicting the enhancement of a progressive award.

In this example, the system 900 has again determined that an enhancement is to be applied to the awarded progressive award. This determination may be the function of the application of a rule set (e.g. automatic enhancement) or as a result of receiving an appropriate player input. As seen in FIG. 9, the player has been awarded the BRONZE level progressive award, thus the BRONZE level progressive award 982*c* of the secondary display 980 is highlighted to indicate that the player won the BRONZE level progressive award 982*c*. Overlying the wagering game 960 on the primary display 914 is a pop-up window 970 that communicates to the player that the player won a progressive award 982*a,b,c*. In FIG. 10 the progressive enhancement 1084 is redeemed and the progressive award 1082*c* is upgraded. Because the progressive enhancement 1084 is redeemed, the number of progressive enhancements banked 1084 is reset to zero ("0) as depicted by the meter 1084 on the secondary display 1080. The SILVER progressive award 1082*b* is highlighted to indicate that the BRONZE progressive award 1082*c* is enhanced to the SILVER award 1082*b*. Overlying the primary games 1060 on the primary display 1014 is a pop-up window 1070 that communicates to the player that the progressive enhancement 1084 is redeemed and the player is upgraded to a higher level progressive award 1082, in this case the SILVER level award 1084*b*.

In alternate embodiments the banked enhancements or tokens may have a limited lifespan or otherwise be configured so as to decay or expire. For example, a banked progressive award enhancement or token may expire at the conclusion of a gaming session. Alternatively, the banked award enhancement or token may be available for only a limited or predetermined time. Gaming events may be used to adjust the lifetime of a banked enhancement, for example to increase or decrease the lifespan. Thus when a progressive award enhancement is banked, an expiration time may be associated with that progressive award enhancement. When the expiration time is reached, the progressive award enhancement associated with that expiration time expires. A timer or any other way of associating a time with the banked progressive award enhancement or token may be used in place of an expiration time to determine if a banked award enhancement or token has expired.

In another alternative embodiment the number of progressive enhancements a player may bank may be a predetermined number greater than one, or may be unlimited. In a similar alternative embodiment, the number of progressive enhancement tokens a player may win may be a predetermined number greater than one, or may be unlimited. Thus, a player may bank more than one token, or the player may be allowed to accumulate more than one progressive enhancement token. In this embodiment, a player would be prompted whether the player wanted to bank a token each time the player won a token. The prompting would continue until the player banked the predetermined number of progressive enhancements. Similarly, the player may be allowed to redeem more than one banked enhancement or collected token. In an embodiment, for example, a player may be permitted to redeem two or more enhancements or tokens to have his awarded progressive award upgraded two or more levels.

In another alternative embodiment, a player could chose to defer using a banked progressive award enhancement or a progressive enhancement token, rather than having it automatically redeemed. For example, if a player won a first progressive award and banked a first award enhancement and subsequently won a second progressive award, the player would be allowed to bank the second progressive award enhancement as well. Similarly, if a player had already won a progressive enhancement token and the player subsequently won a progressive jackpot, then the player would be allowed to defer using the progressive enhancement token and thus accumulate more than one progressive enhancement token. This would allow strategic collection and redemption of the enhancements and/or tokens as a player saw fit.

In a further alternative embodiment, a banked progressive award may be stored by a player and played during a future gaming session. This alternative embodiment may be applied to a progressive enhancement token as well. Thus a progressive enhancement token may be stored by a player and the progressive enhancement token may be played during a future gaming session. For example, the system may remember or recall a player via a player identifier or biometric identifier. When the player commences a subsequent gaming session, the player is identified by the system and any banked enhancements or collected tokens associated with the player may be made available for redemption by the player in the current gaming session.

In an additional alternative embodiment, a banked progressive award enhancement may reduce in value depending on the length of time the banked progressive award enhancement remains un-played or not redeemed. Thus once a progressive award enhancement is banked, the time the progressive award enhancement is banked is tracked. After a certain time frame the value of the progressive award enhancement decreases. Thus, for example, when a progressive award enhancement is first banked the enhancement may be used to upgrade to a next higher-level progressive jackpot. After a certain time frame, the enhancement may be used to upgrade only a percentage of the winnings of a next higher-level progressive jackpot. As further time passes, the value of the banked progressive award enhancement decreases. Similarly, the value of a progressive enhancement token may diminish as time passes. For example, when a progressive enhancement token is awarded, the token may be used to upgrade to a next-higher level progressive jackpot. After a certain time frame, the enhancement may be used to upgrade only a percentage of the winnings of a higher-level progressive jackpot. As time passes, the value of the token decreases. In other embodiments, the value of a banked enhancement or collected token may even increase over time, or vary in other ways over time.

In another embodiment, the progressive award enhancement may comprise elimination of a lowest-level award or lower level award of a progressive game, thereby increasing the likelihood of a player receiving a more valuable progressive award. For example, a progressive game may have a lowest-level BRONZE award, along with a SILVER and GOLD level award. If the player banked a progressive award enhancement, a future progressive award for which the player qualified may be selected from a subset of the available awards, for example a subset including only the SILVER and GOLD levels. In other words, the "enhancement" would be that the BRONZE level would be removed from play. Similarly, redemption of a progressive enhancement token may result in the elimination of a lowest-level award of a progressive game.

In a further alternate embodiment, the pop-up window need not have an overlying touch screen. Instead of receiving inputs from a touch screen, a player may input choices through an electro-mechanical button or any other player input devices described herein.

In yet another embodiment, when a player banks a progressive award in a gaming session and the player does not win a subsequent progressive award, the player is allowed to play the banked progressive award at the conclusion of the gaming session. Playing the banked progressive award may mean the player gets to play a picking game or a random game of some sort.

In still another alternative embodiment, when a first triggering event occurs, a chance to play a bonus or secondary game for a progressive jackpot is awarded instead of the player being directly awarded a progressive jackpot. In the bonus or secondary game, certain outcomes or prizes may include one or more different levels of progressive jackpots. In an additional alternative embodiment the primary and secondary game may be displayed on a single display. The primary and secondary game may be played separately or on a single display. The primary and secondary game may be played separately or together on any type of display in communication with the gaming system.

Each of these embodiments and obvious variations thereof is contemplated as falling within the spirit and scope of the claimed invention, which is set forth in the following claims.

The invention claimed is:

1. A method of operating a wagering game comprising:
- displaying on at least one display device the wagering game and at least one progressive award;
- in response to an input via at least one input device, receiving a wager to play the wagering game;
- upon an occurrence of a first triggering event, offering, by one or more processors, a player an option to accept or reject the at least one progressive award;
- determining, by at least one of the one or more processors, whether or not the at least one progressive award has been accepted by the player;
- if the at least one progressive award has not been accepted by the player,
  - (i) banking a progressive enhancement, and
  - (ii) in response to another wager and then upon an occurrence of a second triggering event, applying, by at least one of the one or more processors, the progressive enhancement to the at least one progressive award; and
- if the at least one progressive award has been accepted by the player, awarding, by at least one of the one or more processors, the at least one progressive award to the player.

2. The method of claim 1, wherein a total number of progressive enhancements that may be banked is limited to a predetermined number.

3. The method of claim 1, wherein the banked progressive enhancement may be played in a later gaming session.

4. The method of claim 1, wherein the at least one progressive award is randomly selected from a plurality of progressive awards.

5. The method of claim 1, wherein the at least one progressive award includes at least a first level and a second level, the first level being a subsequently higher level than the second level.

6. The method of claim 5, wherein in response to applying the progressive enhancement to the at least one progressive award, the second level of the at least one progressive award is awarded, by at least one of the one or more processors, to the player.

7. The method of claim 1, wherein the at least one progressive award is revealed after determining whether or not the at least one progressive award has been accepted by the player.

8. The method of claim 1, wherein the at least one progressive award is selected from a group consisting of a monetary award, a number of free spins, and an opportunity to play another progressive game.

9. A method of operating a wagering game comprising:

displaying on at least one display device the wagering game;

in response to an input via at least one input device, receiving a wager to play the wagering game;

upon an occurrence of a first triggering event, offering, by one or more processors, a player choice of accepting or rejecting at least one progressive award;

in response to the at least one progressive award being accepted by the player, awarding the at least one progressive award to the player;

in response to the at least one progressive award being rejected by the player, banking a token associated with at least one progressive enhancement; and in response to another wager and then upon an occurrence of a second triggering event, redeeming the token and in response thereto applying, via at least one of the one or more processors, the at least one progressive enhancement to the at least one progressive award.

10. The method of claim 9, wherein the token may be redeemed in a later gaming session.

11. The method of claim 9, wherein the progressive enhancement comprises an upgrade to a subsequently higher level of a progressive award.

12. The method of claim 9, further comprising storing the token visually on the at least one display device.

13. The method of claim 9, further comprising displaying on the at least one display device (a) a number of accumulated tokens and (b) a visual representation of the token.

14. A gaming system comprising:

a wager input device for receiving a wager to play a wagering game;

at least one display for displaying the wagering game; and at least one controller to:

(i) upon an occurrence of a first triggering event, offering a player choice of accepting or rejecting at least one progressive jackpot;

(ii) in response to the at least one progressive jackpot being accepted by the player, awarding the at least one progressive jackpot to the player;

(iii) in response to the at least one progressive jackpot being rejected by the player, banking a token associated with at least one progressive enhancement; and (iv) in response to another wager and then upon an occurrence of a second triggering event and in response to banking the token, redeeming the token and in response thereto applying the at least one progressive enhancement to the at least one progressive jackpot.

15. The system of claim 14, wherein the token may be redeemed in a later gaming session.

16. The system of claim 14, wherein the first triggering event is a predetermined outcome of the wagering game.

* * * * *